United States Patent

[11] 3,603,102

[72] Inventor Edmund O. Banas
Newark, Del.
[21] Appl. No. 878,639
[22] Filed Nov. 21, 1969
[45] Patented Sept. 7, 1971
[73] Assignee E. I. du Pont de Nemours and Company
Wilmington, Del.

[54] METHOD AND APPARATUS FOR EXTRACTING HEAT FROM ARTICLES WITH A LIQUID FREEZANT
18 Claims, 1 Drawing Fig.

[52] U.S. Cl. .................................................. 62/64,
99/198
[51] Int. Cl. ................................................ F25d 17/00
[50] Field of Search ..................................... 62/62, 63,
64, 119, 374, 375, 54, 374.5, 514; 99/192, 198, 197

[56] References Cited
UNITED STATES PATENTS
3,486,345  12/1969  Waldin ........................ 62/375

OTHER REFERENCES
J. V. Ziemba " Liquid Nitrogen Freezing Offers Quality With Speed." 10-68 TK341.F6— Food Engineering

*Primary Examiner*—Meyer Perlin
*Assistant Examiner*—Ronald C. Capossela
*Attorney*—Louis H. Rombach

ABSTRACT: In a method, and apparatus, for extracting heat from articles, as in the freezing of food, by directly contacting the articles with a liquid freezant in an open vessel without significant loss of freezant to the atmosphere, the improvement which comprises: contacting the articles from which heat is to be removed with a liquid, fluorinated, $C_1$ to $C_4$ saturated halohydrocarbon, for example, dichlorodifluoromethane, which is at a temperature substantially below, for example, at least 5° C. below, its normal atmospheric boiling point and below the temperature of the articles, for a time sufficient to remove the desired amount of heat and to vaporize at least a portion, but not all, of the liquid; contacting and condensing the vapor with liquid halohydrocarbon as defined above; and collecting, cooling and recycling the liquid halohydrocarbon.

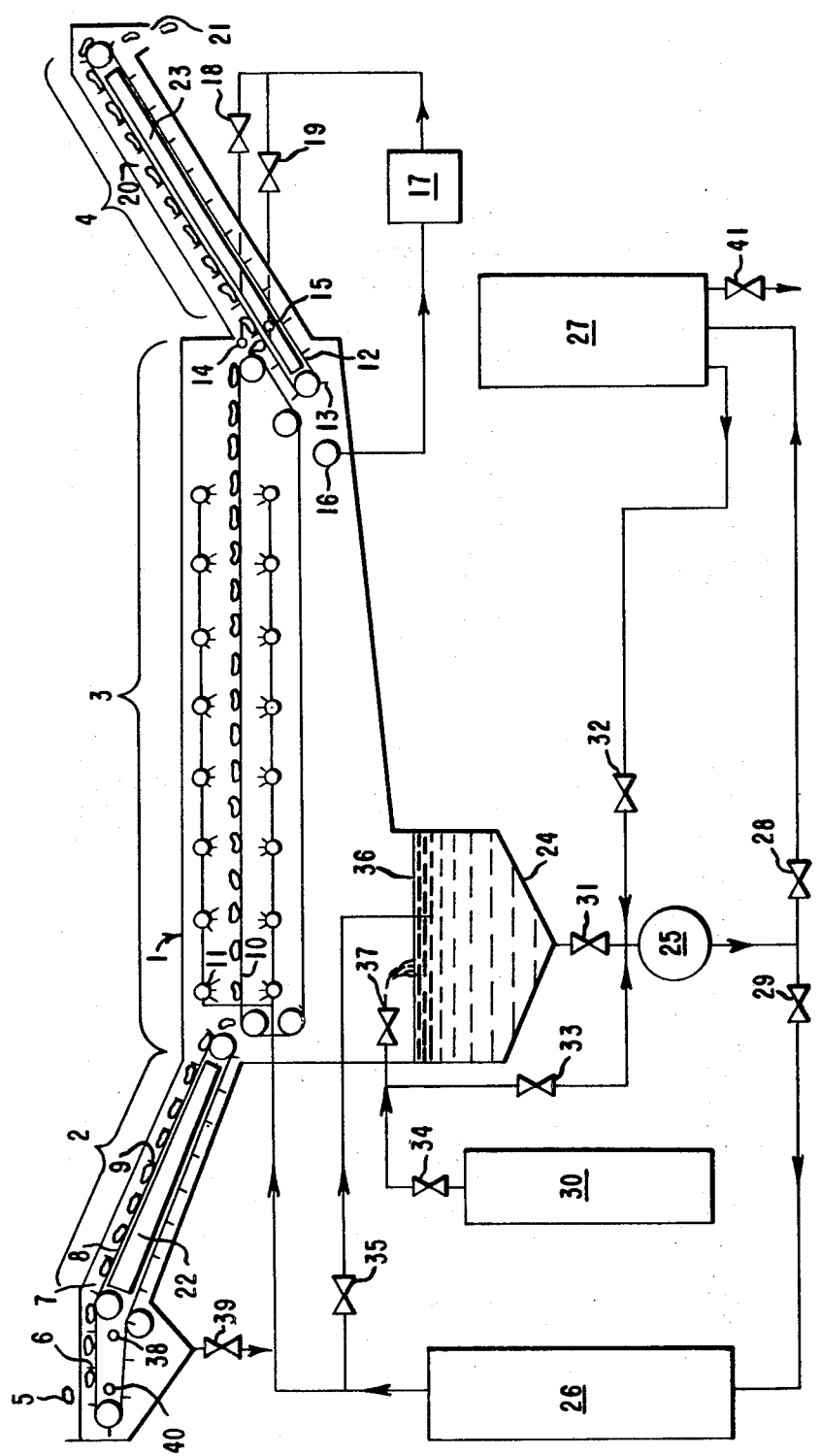
PATENTED SEP 7 1971
3,603,102
INVENTOR
EDMUND O. BANAS
BY  *Louis H. Rombach*
ATTORNEY

METHOD AND APPARATUS FOR EXTRACTING HEAT FROM ARTICLES WITH A LIQUID FREEZANT

BACKGROUND OF THE INVENTION

1. Field of the Invention

This invention relates to the extraction of heat from articles, as in the freezing of food, by directly contacting the articles with a liquid fluorinated halohydrocarbon freezant in an open vessel.

2. Description of the Prior Art

It is known that food can be satisfactorily frozen by direct contact with an ebullient, liquid, fluorine-containing, halogenated alkane freezant. Robillard, in U.S. Pat. No. 2,059,970, teaches the freezing of food by immersion in such a freezant in a vessel which is open to the atmosphere. The disclosed vessel contains openings through which food is introduced and removed at a level intermediate between a body of liquid freezant and a vapor condenser. The freezing method is predicated upon the assumption that the freezant vapors evolved during immersion of the food in the liquid freezant are lighter than air and thus will rise to the top of the vapor space in the vessel where the vapor condenser is located. However, since the vapors of fluorine-containing halogenated alkane freezants are heavier than air, substantial amounts of these vapors are lost by gravity flow out of the openings. Robillard suggests the use of a freezant having a boiling point of about 50° F. (10° C.), since there is less likelihood of losing much of this freezant through the openings.

Waldin in U.S. Pat. No. 3,498,069 discloses a method of, and apparatus for, extracting heat from articles, as in the freezing of food, by directly contacting the articles with an ebullient, liquid, polyfluorinated, $C_1$ to $C_4$, saturated halohydrocarbon freezant in an open vessel, without significant loss of freezant to the atmosphere, by maintaining, by means of a vapor condenser, an air-freezant vapor interface within the vessel below the level of all paths to the outside atmosphere but above the level at which the articles come in direct contact with the liquid freezant. Since the interface levels in the entrance and exit zones of the vessel tend to be higher than directly under the condenser, these zones usually must be elevated. Longer entrance and exit conveyors may be required and the overall headroom needed for the apparatus may be excessive. Furthermore, as pointed out by Waldin in U.S. Pat. Nos. 3,498,069 and 3,482,412, precautions must be taken to minimize the formation of freezant hydrates since such hydrates may foul the condenser. The fouling of condensers can be a serious problem in a process, and apparatus, employing ebullient freezants in an open vessel since diminution of condenser capacity may lead to excessive loss of expensive freezant.

The freezing of foodstuffs with liquefied gases, for example, nitrous oxide, nitrogen, air, and the like, has been described in prior art such as U.S. Pat. Nos. 2,447,249; 3,255,599; 3,277,657; and 3,298,188. Such freezing operations usually involve ebullition of the liquefied gas as it contacts the food, with the formed vapor sometimes being circulated over unfrozen food to provide precooling before the food is contacted with liquid freezant. In some cases, precooling may reduce the tendency of the food to rupture when it subsequently is contacted with liquid freezants having very low boiling points, for example, −196° C. for liquid nitrogen. If systems employing such liquefied gases are open to the atmosphere, the freezant usually is lost. The art teaches that loss of freezant can be avoided by utilizing equipment which is essentially closed off and, if necessary, able to withstand pressure buildup during vaporization and warming of the liquefied gas. Reliquefaction of recovered vaporized gas usually is carried out independently of the food-freezing operation, thus further complicating the overall method and apparatus, particularly where difficulty liquefiable freezants are employed.

There is need in the food-freezing industry for a method, and apparatus, for carrying out the freezing operation economically in compact equipment which is open to the atmosphere and, further, is continuously operable with a minimum of maintenance difficulties.

SUMMARY OF THE INVENTION

It has been discovered that heat can be removed from articles by direct contact with a liquid, fluorinated, $C_1$ to $C_4$ saturated halohydrocarbon freezant in an open vessel without significant loss of the halohydrocarbon by the method which comprises the steps:

A. contacting the article from which heat is to be removed with the liquid halohydrocarbon which is at a temperature substantially below its normal boiling point and below the temperature of the article for a time sufficient to remove the desired amount of heat and to vaporize at least a portion, but not all, of the halohydrocarbon, B. contacting and condensing the halohydrocarbon vapor from (A) with liquid halohydrocarbon; and C. collecting, cooling and recycling the liquid halohydrocarbon from (A) and (B).

Heat can be extracted from articles by the method of this invention in an apparatus which comprises A. an open vessel having an entrance opening and an exit opening.

B. a heat extraction zone within the vessel for removing heat from articles by means of a liquid halohydrocarbon which is at a temperature below that of the articles and substantially below its normal atmospheric boiling point, C. means for introducing articles into the heat extraction zone from the entrance opening, D. means for conveying the articles through the heat extraction zone, E. means for contacting the articles in the heat extraction zone with liquid halohydrocarbon, thereby generating halohydrocarbon vapor, F. means for contacting vapor formed in the heat extraction zone with liquid halohydrocarbon, thereby condensing substantially all of the vapor contacted, G. means for collecting both the unvaporized liquid halohydrocarbon, which has contacted the articles or the vapor, and the condensed liquid halohydrocarbon, H. means for cooling liquid halohydrocarbon, I. means for recycling the collected liquid halohydrocarbon, and J. means for removing the articles from the heat extraction zone through the exit opening.

BRIEF DESCRIPTION OF THE DRAWING

A schematic elevation of a simple heat extraction apparatus which employs the concepts of the present invention is included herein.

DESCRIPTION OF THE INVENTION

1. The Articles

By the method and apparatus of this invention, heat can be extracted from any liquid or solid article. Although the principal use of this invention is for extracting heat from solid food, it also is useful in a wide variety of other applications, including the cooling or freezing of liquids, semisolids or solids.

The term "articles" as used herein is intended to include two or more discrete particles of a single solid commodity, for example, two or more peas or two or more packages such as boxes or pouches containing food, as well as containers of a liquid or semisolid commodity. The size of the articles is not important so long as it is coordinated with the size of the heat extraction vessel, that is, the size of the vessel must be such that the articles will pass through. Heavy meat cuts and large prepared food articles can be frozen more quickly by this invention than by prior art procedures.

Solid foods which can be frozen by this invention include vegetables, such as potatoes, peas, lima beans, green beans, corn, beets, carrots, asparagus, celery, avocados, eggplant, green peppers, radishes, tomatoes and mushrooms; fruits, such as strawberries, blueberries, raspberries, apples, apricots, peaches, plums, cantaloupe, grapefruit, pineapple, cherries and grapes; meats, such as beef, pork, veal, lamb and fowl; and seafood, such as scallops, shrimp, fish, and the like.

These foods can be frozen in their natural form if desired. Large articles of food, such as corn on the cob, whole chickens, and the like, as well as small particle foodstuffs can be frozen readily in accordance with this invention. Large fruits and vegetables can be sliced, iced, or cut into balls before freezing, and fruits such as apples, apricots, peaches, plums, and the like, can be peeled, pitted, and prepared in final portions ready for consumption, for example, in halves, quarters or smaller pieces. Berries are preferably graded, stemmed, washed, and placed in suitable condition for consumption and then immediately frozen. Chunks of meat or seafood can be cut into pieces of suitable size and shape, such as cubes, sticks, patties and the like, and then coated with appropriate materials such as bread crumbs, flour, corn meal and the like, if desired, before freezing.

This invention also is useful in the freezing of aqueous liquids and semisolids. Suitable liquids include fruit and vegetable juices such as orange juice, soup, broth, whole blood, aqueous pharmaceutical preparations, and the like. Suitable semisolids include mashed fruits and vegetables such as apple sauce and mashed potatoes, pastry dough, soup, and the like. The invention also is useful for cooling nonaqueous liquids such as pharmaceutical tinctures and nonaqueous solids such as metal parts with are to be assembled with other parts having close tolerances.

In accordance with this invention, the articles enter the vessel at a temperature above the normal boiling point of the freezant. Under normal circumstances, the articles will enter the vessel at or above the temperature of the ambient atmosphere which usually is above the normal atmospheric boiling point of the freezant.

2. The Freezants

The freezants of this invention are liquid heat extracting agents which extract heat from articles by direct contact with the articles, the physical state of at least a portion, but not all, of the freezant thereby changing from liquid to vapor. The terms "heat extraction" and "heat extracting" are meant to include both the chilling of articles which may or may not contain water and the freezing of articles which contain water, including most foods. Chilling of nonfoodstuffs can be effected with freezants which are not acceptable for use with foods because they impart taste or with freezants which are proscribed for medical safety reasons. The freezants which are suitable for use in the apparatus of this invention are liquid, fluorinated, $C_1$ to $C_4$ saturated halohydrocarbons. The term "fluorinated halohydrocarbon" is intended to include halogen-substituted hydrocarbons containing at least one fluorine atom. Thus, the term includes hydrocarbons in which two or more of the hydrogens are substituted by halogen, one of which halogen is fluorine. The hydrocarbon can be alkane or a cycloalkane.

The liquid freezants of this invention must have normal boiling points, that is, boiling points at atmospheric pressure, such that at least a portion, but not all, of the liquid is vaporized when it contacts the articles to be cooled. Operable freezants include those having a boiling point within the range 35° to −50° C. Preferred freezants have boiling points of −20° to −40° C. With freezants boiling below about −50° C. the freezing of articles such as food may result in undesirable cracking. Moreover, the cooling of a freezant having a boiling point below about −50° C. imposes the need for a refrigeration system more elaborate than those ordinarily used in conventional food freezing plants, thus adding to the freezing cost of such a system without any corresponding advantage. Finally, use of very low boiling liquids may impose an excessive burden on the spray condensing system because of the large volume of vapor generated. The liquids used herein are cooled substantially below their boiling points, usually at least about 5° C. below, and then brought into contact with the articles being cooled or frozen. As a result, cooling is accomplished at a higher rate than is achieved when the same freezants are employed at or near their boiling points. The freezing point of the freezant is an obvious limit to he extent of any cooling of the liquid. If the viscosity of a freezant increases as it is cooled to near the freezing point, a practical limit to the extent of cooling may be reached when the freezant becomes too viscous for satisfactory pumping.

The freezants of this invention have vapor densities at their normal boiling points at least about twice that of air at the same temperature. The invention uses to advantage the greater density of the freezant vapor as compared with air. Preferably, the freezant has a vapor density at its normal boiling point at least about three times that of air at the same temperature.

Fluorinated, $C_1$ to $C_4$ saturated halohydrocarbons having an acceptable combination of boiling point and vapor density are listed table 1.

TABLE 1

| Freezants | Boiling Point, °C. | Vapor Density at Boil. Pt./ Air Density at Same Temp. |
|---|---|---|
| Fluorotrichloromethane | +23.8 | 4.93 |
| Fluorodichloromethane | +8.9 | 3.65 |
| 1,2-Dichlorotetrafluoroethane | +3.8 | 6.14 |
| Octafluorocyclobutane | −5.8 | 7.28 |
| 1,1-Difluoroethane | −24.7 | 2.35 |
| Dichlorodifluoromethane | −29.8 | 4.36 |
| Chloropentafluoroethane | −38.7 | 5.55 |
| Chlorodifluoromethane | −40.8 | 3.10 |

Mixtures of these compounds with themselves and with other compounds also provide suitable freezants so long as the mixture has the boiling point and vapor density described above. Azeotropic mixtures, that is, mixtures which yield vapors of the same composition as the liquid, are particularly suitable. The properties of useful azeotropic mixtures are given in table 2.

TABLE 2

| Azeotropic Freezant Mixtures Components—Weight % | Boiling Point, °C. | Vapor Density at Boil. Pt./ Air Density at Same Temp. |
|---|---|---|
| Dichlorodifluoromethane—25 Chlorodifluoromethane—75 | −41 | 3.28 |
| Chlorodifluoromethane—49 Chloropentafluoroethane—51 | −46 | 3.89 |
| Dichlorodifluoromethane—74 1,1-Difluoroethane—26 | −33 | 3.59 |

Although freezant mixtures which are not azeotropic also can be used, they are more difficult to handle since any vapor lost to the atmosphere during operation of the system will have a higher concentration of the more volatile component. In order to maintain the desired boiling point of the original liquid freezant in the heat extraction vessel when using such a freezant mixture, it is necessary that the makeup freezant mixture have a higher concentration of the more volatile component than the original liquid freezant.

3. The Heat Extraction System

By the operation of the method and apparatus of this invention, heat can be extracted from articles by direct contact with liquid freezant in a heat extraction zone in an open vessel without significant loss of freezant vapor to the atmosphere. By "open vessel" is meant a vessel which is open to the atmosphere, that is, contains at least one opening which allows a free vapor communication between the heat extraction zone and the outside atmosphere, thus maintaining said zone essentially in pressure equilibrium with the atmosphere. In the freezing of food, freezant losses generally do not exceed about 5 lbs. of freezant per 100 lbs. of articles passed through the system. Under the preferred conditions, freezant losses do not exceed about 2 lbs. per 100 lbs. of articles.

The most important concept of the present invention is the use of a liquid freezant for the dual purposes of removing heat from articles by direct contact and condensing that portion of the liquid which is vaporized by heat extracted from the articles. A variety of means can be employed to effectuate the steps of heat removal and vapor condensation. For example, the articles can be contacted with liquid freezant in the form of a flood or spray or the liquid can be in a suitable container into which the articles are introduced. Combinations of these methods can be employed; moreover, the contact can be continuous or intermittent, the latter providing an interrupted cooling or freezing technique or embodiment. The condensation of the vapor generated during contact of the article and the liquid freezant must be effective in order to avoid loss of freezant vapor. Generally, in order to maximize contact of liquid and vapor the dispensation of liquid is by a means which atomizes or sprays the liquid. The cooling or freezing of the articles and the condensation of the vapor can be carried out in a single-chambered vessel. Alternatively, these operations can be carried out in a two (or more) chambered vessel, with the formed vapor being conveyed to a second chamber by appropriate means. The temperature of the liquid freezant is such that at least some, but not all, of the liquid vaporizes when it contacts the articles to be cooled or frozen. The temperature of the liquid which is employed to condense the vaporized freezant must be sufficiently low to condense substantially all the vapor. Regardless of whether separate chambers are used for the colling or freezing of the articles and the condensing of vapor, or whether a single chamber is used to effect both cooling or freezing and condensing, it is obvious that the freezant temperature can vary depending upon its use. Preferably, the invention is carried out in a single-chambered vessel, and the freezant contacts the articles and the generated vapor simultaneously. In this preferred embodiment the temperature of the liquid freezant must be substantially below its normal boiling point, but high enough that some vaporization will occur when it contacts the articles being cooled or frozen. Generally, the temperature is at least 5° C. below the boiling point.

Preferably, the liquid used to condense the vapor is in the form of a spray. This form also is preferred when he contacting and condensation steps are carried out simultaneously in a single-chambered vessel. The spray which contacts the articles can approach the articles from one or more directions. When the spray is being used to contact the articles and the vapor, the spray preferably approaches at least from the top.

The liquid freezant from the cooling or freezing step and from the condensing step is collected, usually in a sump at the bottom of the vessel, cooled and recycled to the input or inputs of the system. Cooling can be effected in a conventional heat exchanger which can be the evaporator of a standard refrigeration system using ammonia or a fluorocarbon refrigerant. The heat exchanger for cooling the liquid freezant can be located at any convenient point within or outside the vessel. When the liquid freezant flow rates in the heat exchanger are within the limits of good heat exchanger design practice, deposits which could reduce heat exchanger capacity do not form.

The heat extraction apparatus of this invention is more compact than apparatus of comparable freezing capacity using the same liquid freezant at or near its boiling point. Because the spray condenser, preferred, does not interpose any metal walls between the vapor and the cold medium to which heat is to be transferred, the required condensing capacity can be provided in less space than with a conventional extended surface heat exchanger. Because of the absence of surfaces upon which deposits can occur and thereby reduce heat transfer, there is no requirement to install larger than theoretically needed equipment.

The vapor space in the heat extraction zone of the apparatus under equilibrium operating conditions contains a mixture of air and freezant vapor because the space temperature is below the boiling point of the freezant. After equilibrium has been established, the air in any passageway to the outside atmosphere contains an air-freezant vapor mixture having a concentration gradient which varies from the maximum possible at the space temperature to zero percent at the level to which freezant vapor must rise in order to pass from the interior of the apparatus to the outside atmosphere. Most commonly the path to the outside atmosphere is an outside opening at the top of the vessel. Under operating conditions, turbulence in any passageway causes additional mixing of freezant vapor with air, thus further increasing the amount of freezant vapor in the mixture in the passageway.

Because the freezants of this invention have vapor densities much greater than the density of air at the same temperature, losses of vapor from openings in the heat extraction vessel can be minimized by providing openings to the outside atmosphere only at the top of the vessel. Freezant vapor losses can be reduced by increasing the distance between the heat extraction zone and the outside openings, thereby providing a longer path for freezant vapors escaping by diffusion. The extent to which the vertical dimension is increased will depend upon economic considerations. Spaces not required for articles or conveyors within any passageways to outside openings can be filled with closed-cell insulating material to minimize the mixing of air and freezant vapor and reduce freezant losses. If conveyors are located in the passageways, sufficient clearance must be provided to reduce the pumping in of air and pumping out of freezant vapor by the moving conveyors.

Mixing of freezant vapor and air can be reduced by minimizing the turbulence caused by introducing and removing articles from the heat extraction vessel. Articles should be introduced without substantially disturbing the air-freezant vapor mixture in the entrance passageway and without introducing any substantial quantities of air. Articles should be removed without substantially disturbing the air-freezant vapor mixture in the exit passageway and without carrying out any substantial quantities of freezant vapor. Free vapor communication between the outside atmosphere and the heat extraction zone is important in the entrance passageway because it allows freezant vapor to largely displace the air surrounding the articles without introducing substantial quantities of air into the heat extraction zone. In the exit passageway, air largely replaces the freezant vapor surrounding the food and freezant losses with the frozen food are minimized. Dry air can be introduced into the upper reaches of the exit passageway, if desired, to prevent the accumulation of moisture on the frozen food or the conveyor.

Turbulence is minimized during introduction of the articles through the entrance passageway by passing the articles slowly from the entrance opening to the heat extraction zone. Suitable speeds will vary depending upon the size and shape of the articles being introduced. Generally, it is preferred that the articles move from the entrance opening to the heat extraction zone at a speed not in excess of 100 feet (30.48 meters) per minute. Most preferably the articles are passed from the entrance opening to the heat extraction zone at a speed of less than 50 feet (15.24 meters) per minute. Also preferably, the articles are introduced without any tumbling motion which would create turbulence.

Although the articles preferably are passed through an entrance passageway from the entrance opening to the heat extraction zone, the use of an enclosed passageway is not required. The purpose of an entrance passageway is to somewhat limit the open area in the entrance zone, thereby reducing convection currents and the volume of air pushed out of the entrance opening under nonsteady load conditions. The passageway also tends to reduce the effect of ambient air currents. This passageway, however, should not restrict free vapor communication between the heat extraction zone and the entrance opening.

A number of conveying means can be used to convey the articles from the entrance opening to the heat extraction zone. Suitable conveyors for handling solid articles include belt conveyors, such as wire mesh and other foraminous belts and impervious belts, auger type conveyors, short stroke vibratory conveyors, and the like. The conveyors should be chosen so as to minimize turbulence in the entrance passageway and to allow free communication between the outside atmosphere and the heat extraction zone. Liquids which are to be chilled or frozen are most readily handled by first sealing them in a container. Such containers or any regularly shaped articles can be introduced into the heat extraction zone through a pipe which is not open to the atmosphere. It is important that the pipe be filled with a continuous stream of the articles whereby essentially no air is introduced into the heat extraction zone.

After the articles have passed through the heat extraction zone, they can be removed from the vessel by passing them upward and out of the vessel through an exit opening which is in free vapor communication with the heat extraction zone. Turbulence is minimized during the removal of the articles by passing them upward slowly to the exit opening. Preferably, the articles are passed upward at the same rates specified for passing them downward from the entrance opening. As the articles pass upward, the freezant vapor is replaced with air. The conveyors used to remove the articles from the vessel can be of any of those mentioned as being suitable for passing solid articles from the entrance opening to the heat extraction zone. An enclosed exit passageway is preferable but not required.

Analogous to the previously described methods of introducing articles into the vessel, articles can be removed from the heat extraction zone and/or the vessel by any means which does not introduce essentially any air. For example, articles can be removed from the heat extraction zone and/or the vessel through a pipe. In this case the liquid or semisolid which provides the seal between the inside of the vessel and the outside atmosphere need not be the articles being treated. any suitable liquid or semisolid can be employed to provide the seal, with the treated articles being removed from the heat extraction zone and/or the vessel in or through the liquid or semisolid.

Vapor losses from the entrance and exit passageways can be minimized by feeding the articles into the heat extraction vessel at a constant rate. With the articles fed at a constant rate, and the introduced liquid freezant being held at a constant temperature, the air from the outside atmosphere which enters the passageways does not surge in and out and never reaches the heat extraction zone. Thus, even when the outside atmosphere is humid, excessive frosting of the conveyor is avoided.

The temperature at any level in the vessel is not necessarily the same in all zones. Since the freezant liquid contact with the warm articles takes place in the heat extraction zone, the temperature in this zone tends to be somewhat lower than the temperature in the entrance and exit zones. The extent to which this difference in temperature exists will be affected by the degree of isolation between zones, that is, whether entrance and exit passageways are present. The temperature in the entrance zone is further increased by the comparatively warm articles being introduced through it.

Due to the effect of temperature on the density of gases, the warmer gases in the entrance and exit zones will be substantially less dense than the gases in the heat extraction zone. The density of gases at 10°–20° C., for example, is only about 80 percent of the density of the same gases at a typical liquid freezant temperature of 31 40° C. In any freezing apparatus employing the heat exchange surfaces of a condenser, the entrance and exit passageways must be elevated so that the less dense gases in these zones can overcome the resistance to vapor flow offered by the condenser. In the apparatus of the present invention, freezant vapor is condensed by the liquid freezant and elevated passageways for the entrance and exit conveyors are not required. The opening to the outside should be at least as high as the top of the heat extraction vessel. Economic considerations will govern the amount of any elevation of passageways and the precautions taken to minimize freezant vapor looses from diffusion or conveyor movement. The design of the freezant liquid delivery means must avoid loss of freezant liquid as a mist or fog from the passageways.

In its broadest aspect, the heat extraction vessel of this invention can contain but a single outside opening. This single opening can result from there being no top cover on the vessel or a top cover containing a single outside opening. The single opening can be an exit opening when the articles are introduced into the heat extraction zone through a pipe, or it can be an opening through which articles are both introduced and removed.

When solid food is frozen, it is preferred that there be at least two outside openings, one for introducing the food and the other for removing the food. Because food generally has a substantial moisture content, it is not desirable to pass food into and out of the vessel through the same opening. Otherwise the water vapor surrounding the food being introduced tends to condense on the frozen food being removed. This results in the formation of an undesirable layer of frost on the frozen food.

The heat extraction can be carried out either by continuously contacting the articles with the liquid freezant until the desired amount of heat has been extracted, or by an interrupted freezing technique in which the articles are first contacted with the liquid freezant until only a portion of the desired amount of heat is extracted, and then removed from contact with the freezant, thereby allowing the icy shell to cold-flow and relieve internal stresses before contact with the liquid freezant is resumed. Interrupted freezing with intermittent contact between the articles and freezant minimizes cracking or splitting of those articles which tend to crack or split when cooled rapidly. When the process is carried out using the same freezant sprays to cool the articles and condense the vapor, interrupted freezing can be effected either by placing one or more shields over portions of the freezing conveyor or by turning off selected sprays.

Cracking or splitting of certain foods such as larger vegetables and fruits, for example, potatoes or apples, can be minimized or prevented by hindering liquid freezant contact with a portion of the surface, thus delaying freezing of that portion until the interior has been frozen. The soft unfrozen exterior portion then can yield and relieve the pressure caused by freezing of the interior. The shielding of a portion of the surface can be provided by employing a soft, closed-cell foam conveyor belt cover which precludes contact between freezant and the lower surface of the food, or by preventing liquid freezant contact with the selected surface by a freezant vapor sweep. The unfrozen surface subsequently is frozen by shifting the articles on the foam belt cover or by ending the vapor sweep.

The particular manner in which the food is passed through the heat extraction zone is of no importance to the present invention. Suitable means of moving articles through the heat extraction zone include a foraminous belt, a mechanical auger, short stroke vibratory conveyors, and the like. When the first contact between solid food and liquid freezant is to be on a belt conveyor, the conveyor should have a minimum area of contact with the food so that sticking of the food to the conveyor by freezing is minimized. A suitable conveyor for this purpose is a wire mesh conveyor having needle point contact with the food. Wire mesh conveyors having a nonstick coating such as polytetrafluoroethylene can be used.

Because of the use of liquid freezants cooled substantially below their boiling points, the surfaces of frozen food articles often are covered with a film of liquid freezant at the end of the time of liquid contact. Unless the surface has risen to a temperature sufficient to vaporize the freezant before the frozen food is discharged, liquid freezant will be carried out of the apparatus and lost. Under satisfactory operating conditions, conveyor speeds and liquid contact are coordinated so that the equilibration of internal temperatures of the frozen food articles raises the surface temperature of the articles sufficiently to vaporize the freezant while the food articles are moving up the exit conveyor. The tumbling of the food articles as they are transferred from the freezing conveyor to the exit conveyor dislodges pools of liquid freezant from the articles but leaves the surface wet with liquid. The liquid freezant clinging to the surface of the food articles can be swept from the food by high velocity jets of an air-freezant vapor mixture directed at the food on the exit conveyor from above or below. The vapor can be withdrawn from any desired location within the vessel where liquid freezant will not be entrained. The location and velocity of the vapor mixture jets must be such that freezant vapor is not forced out of the exit passageway. Optionally, makeup freezant liquid can be vaporized and used in sweeping liquid freezant from the frozen food. Continued equilibration of internal temperatures of the frozen food results in vaporization of much of the freezant liquid not swept from the food by the high velocity vapor. The loss of freezant from the heat extraction vessel is thus reduced to a commercially acceptable level.

The freezing of high moisture content foods, especially when they have been cut or sliced, or the immediate freezing of foods which have been blanched or otherwise treated with aqueous brines, as is commonly practiced, may result in a high moisture intake into the freezing vessel. The vapor of the preferred freezant, dichlorodifluoromethane, forms a crystalline or semisolid hydrate in the presence of water vapor at temperatures between about 0° C. and 7° C. If this hydrate forms on the food during the freezing process, then during thawing of the food and accompanying decomposition of the hydrate, it may impart an unattractive frothy appearance. The formation of freezant hydrate does not interfere with the continued operation of the process and apparatus of the present invention. Since the food can be contacted rapidly, for example, using a high velocity spray, with a liquid freezant whose temperature is below the critical hydrate formation temperature, such formation is minimized. MOreover, the hydrate particles which do form are very small and do not become visible on the food at any time. Still further, since there are no condenser surfaces, hydrate accumulation cannot affect condenser capacity, nor can accumulated hydrate drop from the condenser onto the food. Food-freezing operations can be conducted for extended periods without interruptions for hydrate removal; the hydrate which may deposit on interior surfaces under extreme conditions can be removed readily when the apparatus is routinely serviced.

In a food-freezing operating using dichlorodifluoromethane (b.p. −29.8° C.) cooled to −34° to −40 ° C. and introduced into the system as a spray, particulate foods such as peas and chopped carrots were frozen with from 25 to 40 percent less direct liquid contact time than with uncooled ebullient dichlorodifluoromethane, that is dichlorodifluoromethane at or near its boiling point. The freezing apparatus was of commercial scale employing conveyor belts of 3 to 4 feet (0.914 to 1.219 meters) width. Although the example just described employed only spray contact, if desired, the food can be initially contacted with dichlorodifluoromethane in a sluice pan to provide a frozen crust as disclosed by Waldin in U.S. Pat. No. 3,479,833, with freezing being completed by means of a spray. In this alternative method, all freezant vapor is condensed by being contacted with liquid.

DETAILED DESCRIPTION OF THE DRAWING

In the drawing representing an embodiment of this invention, the heat extraction apparatus comprises insulated heat extraction vessel 1 within which articles carried on belt conveyors are contacted with a cooled liquid fluorinated halohydrocarbon freezant, as disclosed above, until they are partially or completely frozen or chilled. The freezant evaporated by the heat extracted from the articles is condensed by the freezant sprays used to freeze or chill the articles.

Heat extraction vessel 1 contains entrance zone 2, heat extraction zone 3, and exit zone 4. Articles 5 are introduced through entrance opening 6 and carried downward into entrance passageway 7 by variable speed entrance conveyor 8 which is of wire mesh construction and may have cleats 9 of a height and spacing suitable for the articles being handled.

As the articles pass downward through entrance passageway 7, air surrounding the articles and in the interstices of the articles is largely displaced by heavy freezant vapor. The concentration of freezant vapor in the air-freezant vapor mixture in the heat extraction zone is always less than 100 percent because the temperature in the heat extraction zone is always less than the boiling point of the freezant. The articles are transferred to variable speed heat extraction conveyor 10 which is of wire mesh construction without cleats and traverses the heat extraction zone.

As the articles enter the heat extraction zone, they are immediately contacted by sprays 11 of precooled liquid freezant. Each spray distributes liquid across the heat extraction conveyor and is equipped with an adjustable flow regulating valve (not shown). The orientation and location of the sprays and the volume of freezant flow are selected to minimize the freezing or chilling time for each type of article. Contact with freezant sprays can be interrupted periodically, if required to avoid cracking and splitting, by allowing time for equilibration of internal stresses. Since the freezant sprays are also the freezant vapor condensers, the interruption of liquid contact can be provided either by placing shields (not shown) over portions of the heat extraction conveyor or by turning off selected sprays. The speed of the conveyors is regulated as required to permit articles of widely different size and heat content to be frozen or chilled to any desired extent during passage through the heat extraction vessel.

Articles leaving the heat extraction conveyor are tumbled or tilted to dislodge pools of freezant liquid as they fall onto exit conveyor 12 which is also of wire mesh construction and is wider and has higher cleats 13 than entrance conveyor 8, but is otherwise similar. If the articles are of suitable size and shape, they can be stacked on the exit conveyor. The exit conveyor can travel more slowly than the entrance conveyor to allow more time for the surface temperature of the articles to rise sufficiently to vaporize liquid freezant.

Liquid freezant clinging to the surfaces of the articles or lying in surface depressions can be swept from the articles by high velocity jets of air-freezant vapor mixture directed at the articles on the exit conveyor from above or below by manifolds 14 or 15. Vapor can be withdrawn from the heat extraction zone through port 16 by blower 17 and directed to the desired manifold through valves 18 or 19.

As the frozen or chilled articles are conveyed upward through exit passageway 20, heavy freezant vapor in the interstices of the articles is largely replaced by air. The frozen or chilled articles are discharged from the exit conveyor through exit opening 21.

Spaces between the counter-moving belt sections of the entrance conveyor 8 and the exit conveyor 12 are filled with sections of closed-cell foam insulating material or other impervious barriers as shown at 22 and 23 to minimize the mixing of air and freezant vapor in the entrance and exit passageways. Clearance between the conveyors and the walls of the passageways is made small to minimize losses by diffusion, but clearance must be provided to prevent the direct pumping in of air and pumping out of freezant vapor by the moving conveyors.

Liquid freezant from the sprays collects in sump 24 and is delivered by circulating pump 25 to heat exchanger 26 which is the evaporator of a standard refrigeration system using ammonia or a fluorocarbon refrigerant and capable of producing the desired liquid freezant temperature. Liquid storage vessel 27 is provided to hold as a liquid all of the freezant normally in the heat extraction system. It is designed to withstand the pressure developed when the storage vessel and its contents reach the ambient temperature in the operating area. Pump 25 delivers liquid freezant to the storage vessel 27 when valve 28 is open and valve 29 is closed.

When the freezing or chilling operation is started in an apparatus that is at ambient temperature, liquid freezant is delivered to pump 25 from storage vessel 27 or makeup freezant bulk storage tank or shipping cylinder 30 by closing valve 31 and opening either valve 32 or valves 33 and 34. The flow of cooled freezant to sprays 11 is initiated by starting pump 25 and closing freezant liquid bypass valve 35. During startup an auxiliary surface condenser (not shown) can be provided within the heat extraction zone to minimize loss of freezant from the apparatus. When sufficient liquid freezant accumulates in sump 24, valve 31 is opened. The freezing or chilling of articles can be commenced when the heat extraction zone is reduced to the desired operating temperature. During normal operation valve 31 is open and valves 32 and 33 are closed. Freezant liquid bypass valve 35 is adjusted to return excess liquid to the sump if the required number of sprays cannot handle the entire pump output. The temperature of the liquid supplied to the sprays is closely regulated by conventional control means. Liquid level 36 in the sump is regulated by level control valve 37 which allows makeup freezant to enter as required. For servicing the equipment or at the end of a freezing or chilling operation, freezant is removed from the sump 24 by pump 25 and delivered to storage vessel 27.

When used for freezing food, all parts of the freezing apparatus which come in contact with the food should be made of materials capable of being cleaned by methods normally used for cleaning food handling equipment. Entrance conveyor 8 can be cleaned during operation whenever ice or food debris accumulates on the conveyor belt. A suitable detergent solution is sprayed on the return flight of the conveyor through spray manifold 38, thereby dislodging debris. Water and debris are drained from the conveyor housing through valve 39. Air manifold 40 is used to blow air through the conveyor belt, thereby removing water from the belt before food is placed upon it. Any excess water or other liquid introduced with the food at entrance opening 6 passes through the entrance conveyor 8 and is discharged through valve 39.

When all the liquid freezant in storage vessel 27 has been removed, any residue remaining in the vessel can be removed through drain valve 41. The residue remaining in storage vessel 27 consists of material which has been dissolved or entrained in the freezant. Entrained material can be removed from circulating liquid freezant by means of a suitable filter (not shown) which can be installed on the discharge side of pump 25. The filter can be either a direct in-line filter or a bypass filter so as to handle either all or only a portion of the freezant discharged from pump 25.

The embodiments of the invention in which an exclusive property or privilege is claimed are defined as follows:

1. The method of extracting heat from an article by direct contact with a liquid halohydrocarbon freezant in the heat extraction zone of an vessel open to the atmosphere without significant loss of freezant vapor to the atmosphere, which method comprises
   A. contacting the article from which heat is to be removed with a liquid, fluorinated, $C_1$ to $C_4$ saturated halohydrocarbon which is at a temperature substantially below its normal boiling point and below the temperature of the article, until the desired amount of heat is removed from the article and at least a portion, but not all, of the halohydrocarbon is vaporized,
   B. directly contacting and condensing the vaporized halohydrocarbon from (A) with liquid halohydrocarbon as above defined, and
   C. collecting, cooling and recycling the liquid halohydrocarbon from (A) and (B).

2. The method of claim 1 wherein the same halohydrocarbon is used in steps (A) and (B) and the boiling point thereof is 35° to −50 C.

3. The method of claim 2 wherein the liquid halohydrocarbon contacting the article and the vapor is at a temperature at least 5° C. below its normal boiling point and is in the form of a spray which simultaneously contacts the articles and the vapor.

4. The method of claim 2 wherein the boiling point is −20° to −40° C., the article is food which is being frozen, and the temperatures of the halohydrocarbon contacting the article and the vapor are the same and are at least 5° C. below the normal boiling point of the halohydrocarbon.

5. The method of claim 4 wherein the halohydrocarbon is dichlorodifluoromethane.

6. The method of claim 4 wherein the liquid halohydrocarbon in (A) and (B) is in the form of a spray which simultaneously contacts the food and the vapor.

7. The method of claim 4 wherein the heat is extracted from the food by an interrupted technique in which the contact between food and liquid is intermittent.

8. The method of claim 4 wherein food particles are introduced into the heat extraction zone by being pumped into the vessel through a pipe which is not open to the atmosphere, and are removed from the vessel by passing them from the heat extraction zone to an exit opening at a speed not in excess of 100 feet (30.48 meters) per minute.

9. The method of claim 4 wherein food particles are introduced into the heat extraction zone by first introducing them into the vessel through an entrance opening which is in free vapor communication with the heat extraction zone, and then passing them downward from the entrance opening into the heat extraction zone, and wherein the particles are removed from the vessel by passing them from the heat extraction zone to an exit opening, the speed of the particles being not in excess of 100 feed (30.48 meters) per minute when entering the heat extraction zone from the entrance opening and when being passed from the heat extraction zone to the exit opening.

10. The method of claim 9 wherein the speed of the particles is less than 50 feet (15.24 meters) per minute.

11. The method of claim 10 wherein the freezant is dichlorodifluoromethane.

12. Heat extraction apparatus which comprises
   A. an open vessel having an entrance opening and an exit opening,
   B. a heat extraction zone within the vessel for removing heat from articles by means of a liquid halohydrocarbon which is at a temperature below that of the articles and substantially below its normal atmospheric boiling point.
   C. means for introducing articles into the heat extraction zone from the entrance opening,
   D. means for conveying the articles through the heat extraction zone,
   E. means for contacting the articles in the heat extraction zone with liquid halohydrocarbon, thereby generating halohydrocarbon vapor,
   F. means for contacting vapor formed in the heat extraction zone with liquid halohydrocarbon, thereby condensing substantially all of the vapor contacted,
   G. means for collecting both the unvaporized liquid halohydrocarbon, which has contacted the articles or the vapor, and the condensed liquid halohydrocarbon,
   H. means for cooling liquid halohydrocarbon,
   I. means for recycling the collected liquid halohydrocarbon, and
   J. means for removing the articles from the heat extraction zone through the exit opening.

13. The apparatus of claim 12 in which the means for contacting the articles with liquid provides interrupted contact.

14. The apparatus of claim 12 in which a single means provides the liquid contact with the articles and the vapor.

15. The apparatus of claim 14 in which the single means provides a spray of liquid.

16. The apparatus of claim 12 in which the means for introducing articles is a pump communicating with the heat extraction zone through a pipe.

17. The apparatus of claim 12 in which the entrance opening is in free vapor communication with the heat extraction zone, and the means for introducing articles into the heat extraction zone from the entrance opening is a downward conveyor.

18. The apparatus of claim 17 which also has an entrance passageway from the entrance opening to the heat extraction zone and an exit passageway from the heat extraction zone to the exit opening.